United States Patent [19]

Cheslog

[11] Patent Number: 5,659,601
[45] Date of Patent: Aug. 19, 1997

[54] METHOD OF SELECTING A COST EFFECTIVE SERVICE PLAN

[75] Inventor: Robert Jacob Cheslog, Grayslake, Ill.

[73] Assignee: Motorola, Inc., Schaumburg, Ill.

[21] Appl. No.: 437,346

[22] Filed: May 9, 1995

[51] Int. Cl.⁶ .......................... H04M 15/00; H04M 11/00
[52] U.S. Cl. ........................ 455/406; 379/119; 379/121
[58] Field of Search ........................... 379/112, 111,
379/114, 115, 116, 117, 118, 119, 121,
130, 131, 58, 59, 60, 221, 220; 370/238

[56] References Cited

U.S. PATENT DOCUMENTS

| | | | |
|---|---|---|---|
| 4,979,207 | 12/1990 | Baum et al. | 379/112 |
| 5,027,388 | 6/1991 | Bradshaw et al. | 379/112 |
| 5,218,632 | 6/1993 | Cool | 364/401 |
| 5,297,189 | 3/1994 | Charbernaud | 379/114 |
| 5,301,223 | 4/1994 | Amadon et al. | 379/58 |
| 5,303,297 | 4/1994 | Hillis | 379/114 |
| 5,325,290 | 6/1994 | Cauffman et al. | 379/126 |
| 5,400,395 | 3/1995 | Berenato | 379/114 |
| 5,546,445 | 8/1996 | Dennison et al. | 379/114 |
| 5,553,131 | 9/1996 | Minervino et al. | 379/112 |

*Primary Examiner*—Curtis Kuntz
*Assistant Examiner*—Paul Loomis
*Attorney, Agent, or Firm*—John J. King

[57] ABSTRACT

A unique cellular telephone billing system (100) processes call detail records (102) of cellular telephone calls made by users of customers to produce invoices and reports containing consolidated billing, usage and cost information for the current and other eligible cellular service plans. Eligible cellular service plans are identified for each user in a candidate file and costs for accumulated usage data are calculated (216) under the current and eligible cellular service plans. The calculated costs for the current and eligible cellular service plans may then be compared to determine the most cost effective service plan for each user on the basis of peak and off-peak usage and customer discounts. Reports may be generated (218) for each user illustrating consolidated billing, usage and cost information by sorting on the basis of the corresponding key identification number and information format.

10 Claims, 5 Drawing Sheets

METHOD OF SELECTING A COST EFFECTIVE SERVICE PLAN

FIELD OF THE INVENTION

The present invention is generally related to billing systems, and more particularly to a method of selecting a cost effective service plan provided by cellular telephone service resellers.

BACKGROUND OF THE INVENTION

Cellular telephone billing systems currently accept cellular telephone call detail data on a periodic basis by electronic transmission or on magnetic media from cellular telephone carriers, process the call detail data on the tapes, and typically generate monthly invoices for the user associated with each cellular telephone number. For a customer owning a large number of cellular telephones with associated cellular telephone numbers, a different monthly invoice (in varying formats) is typically generated by a reseller for each of the cellular telephone numbers. Each such monthly bill may be based on different cellular service plans, since a reseller typically offers several different service plans for each cellular telephone system providing service to the same market. As a result, it is extremely difficult to determine for each cellular telephone if a different service plan may be more cost effective than the current service plan.

Previously, billing providers have provided on a periodic basis both consolidated cost and usage information for the cellular telephones owned by a customer, and cost estimates for the eligible cellular service plans for each of its cellular telephones users, in order to efficiently and cost effectively provide billing services for the cellular telephones. For example, A Method of Selecting the Most Cost Effective Cellular Service Plan Provided By Telephone Resellers To Multi-line Customers is disclosed in U.S. Pat. No. 5,027,388, filed on Jun. 1, 1990 by Andrea E. Bradshaw, David M. Baum and Dionne A. Rivera and assigned to the assignee of the present invention, the entire patent of which is incorporated by reference. However, the method of U.S. Pat. No. 5,027,388 is based on cost estimates and many result in less accurate information regarding cost effective cellular service plans.

Accordingly, there is a need for an improved cellular telephone billing system that provides accurate rate analysis for current and alternative cellular service plans.

DETAILED DESCRIPTION OF THE PREFERRED EMBODIMENT

Figure 1:
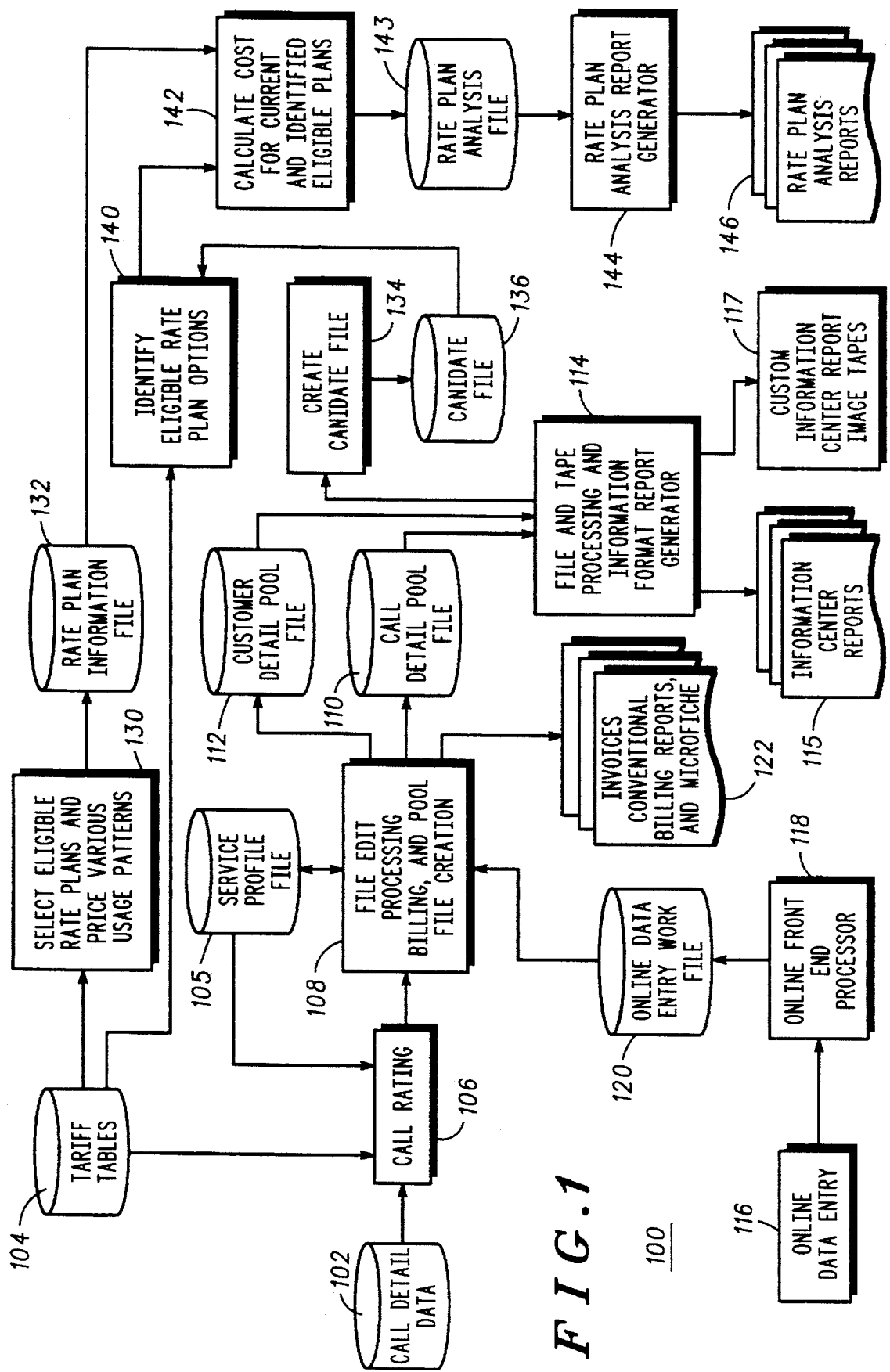
FIG. 1 is a diagram of a cellular telephone billing system embodying the present invention.

Referring to FIG. 1, a billing system 100 embodying the present invention is shown. Billing system 100 processes user records of telephone calls made by cellular subscribers or users in various wireless communication systems operated by cellular carriers throughout the United States and/or other countries of the world. While a cellular telephone system is recited consistently in reference to Applicant's invention, it will be understood that the present invention could be incorporated in any billing system for any communication system, such as a system for Personal Communication Services (PCS), a paging network or a wireless data network.

For each cellular telephone call made by or to a cellular radiotelephone user, at least one call detail record is created in the cellular system processing the call. Each such call detail record includes information relating to the call, including, but not limited to, the cellular telephone number, the electronic serial number of the cellular telephone, the called telephone number, the time the call was placed, the time duration of the call, and other information depending on the cellular carrier processing the call. On a periodic basis, the call detail records accumulated by a cellular carrier are processed to produce cellular telephone bills for each user for which calls were processed.

A reseller of cellular services obtains cellular telephone numbers from carriers in a number of different cities. The reseller provides telephone numbers directly to a user and then bills the user typically on a monthly basis for the telephone calls made by the user. In order for the reseller to generate the monthly bills, billing system 100 is utilized to process on a periodic basis call detail records from multiple carriers for each user telephone number billed by the reseller.

For a customer which owns a number of cellular telephones operated by its user-employees, it is desirable to receive consolidated billing and usage information and calculated costs for other eligible service plans for all of its cellular telephones, as well as individual bills for each of its user-employees. In the diagram of FIG. 1, call detail data 102 is received from cellular carriers in many different cities or geographical areas. The call detail data 102 from each carrier may be received on magnetic tapes, cartridges, data sets or other suitable storage media, may be received electronically, and may be received in a number of different data formats. At block 106, the call detail data 102 is batch processed on a periodic basis to reformat, rate, add a user's key identification number and information format, and consolidate the new call detail data with the previous data, using tariff tables 104 and service profile file 105.

Next, at block 108, according to the present invention, the previously collected call detail data from block 106 may be processed to select all records including the key identification number and create two data billing pools or files, called the call detail file 110 and the customer detail file 112. Records in customer detail file 112 contain customer related information, including, but not limited to, the billing account number, cellular telephone, electronic serial number of a cellular telephone, rate plan, features plan, air time charges, landline charges, feature charges, roaming charges, customer discounts, and taxes. Records in call detail file 110 contain information related to the calls placed by the cellular telephone, including, but not limited to, cellular telephone number, electronic serial number of a cellular telephone, the called telephone number, the date the call was placed, the time the call was placed, and the duration of the call. The call detail records may be processed further to create user invoices, pre-selected management reports, and microfiche data sets 122.

The customer detail pool file 112 and call detail pool file 110 may be outputted on tapes or other suitable media or may be transmitted electronically and are further processed at a step 114. In the preferred embodiment, the processing of blocks 106 and 108 is performed using conventional billing software which has been modified to include the ability to associate key identification numbers and information formats for all cellular telephone numbers of each customer. One source of such software is Cincinnati Bell Information Systems, Inc. having a place of business at 600 Vine Street, Cincinnati, Ohio 45202.

Online data entry at block 116, which utilizes online front end processor 118 to produce an online data entry work file 120 which is transferred to block 108 where it is utilized to maintain service profile file 105, to provide and/or edit the unique key identification number and the information format for cellular telephone numbers of a new customer and/or users, and to correct or provide additional call detail data. The tariff tables are processed at a step 130 to select those rate plans which are currently offered for subscription and populate the retail plan information file 132. The customer detail pool file 112 is processed at a step 134 to create the candidate file 136, consisting of one or more records per cellular telephone number per billing month. Records in this file contain, but are not limited to, the listed general data elements, periodic data elements, plan, account, carrier, and market data elements, line specific analysis data elements, account aggregation analysis data elements, and summary data elements.

At a step 140 the plan, account, carrier, and market data elements of the candidate file 136 are examined and compared with tariff provisions of the tariff tables 104 resulting in the identification of rate plans to which the cellular telephone number might be subscribed. The current rate plan and all eligible rate plans are then calculated at a step 142, resulting in the evolution of the candidate file 136 to the rate plan analysis file 143. The rate plan analysis file is then processed at a step 144 producing the rate plan analysis reports 146.

Figure 2:
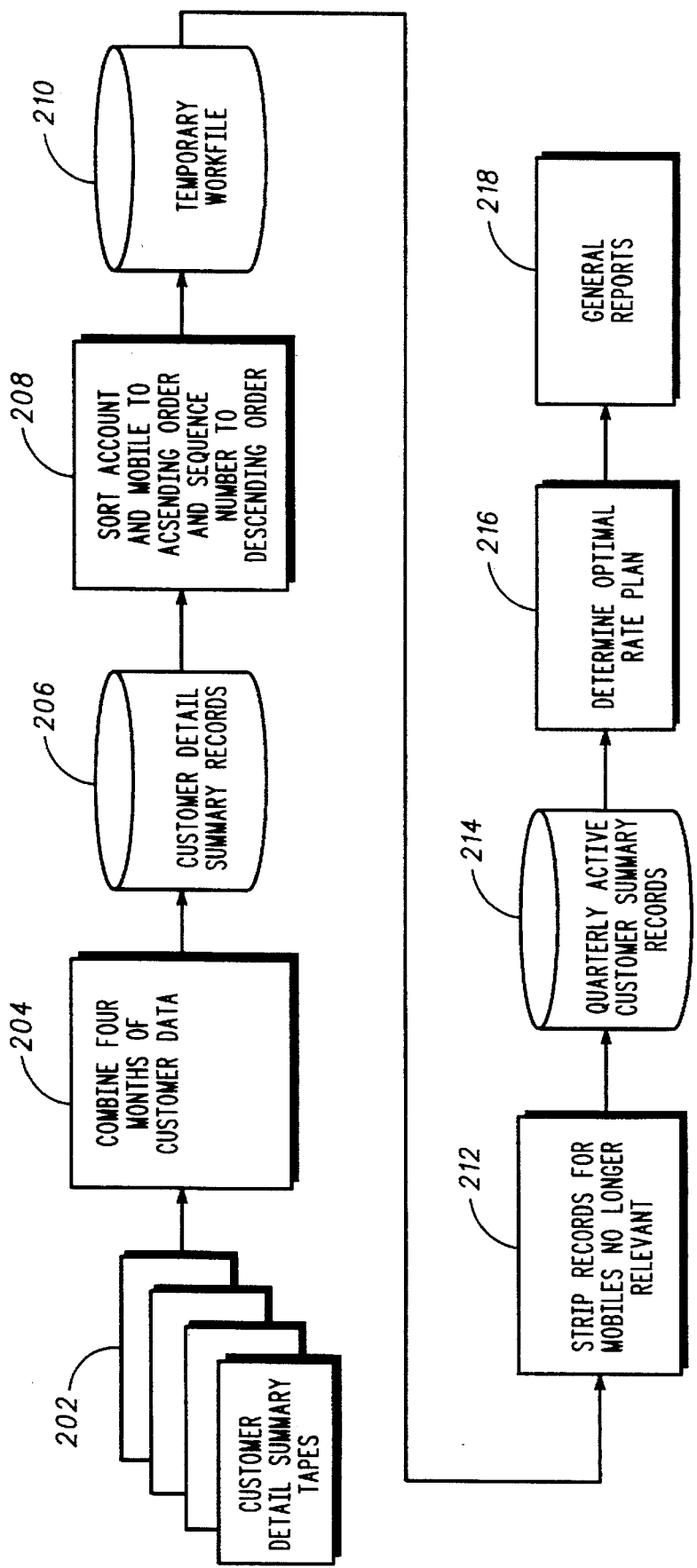
FIG. 2 is a flow diagram for generating the rate plan analysis reports produced in the cellular telephone billing system in FIG. 1.

Referring now to FIG. 2, a flow diagram for step 142 in FIG. 1 illustrates the further processing of the customer detail summary tapes 202 of the rate plan analysis file 143. A customer detail summary tape 202 is produced for each billing month by the cellular telephone billing system at step 114 in FIG. 1. In the preferred embodiment of the present invention, data from four months is required to produce the customer detail summary records file 206. The four months are the three of the previous billing period, to which customer detail summary records file 206 will apply, plus the first month of the current billing period during which processing will occur. The customer detail summary tapes 202 for these four months may be processed individually, or in groups. These tapes are processed at 204 on a mainframe computer, such as an International Business Machines 3090, using the file maintenance utility "File-Aid" available from COMPUWARE, to combine multiple tapes and strip records applicable to single line customers, special sub-header records, producing the customer detail summary records file 206.

Figure 3:
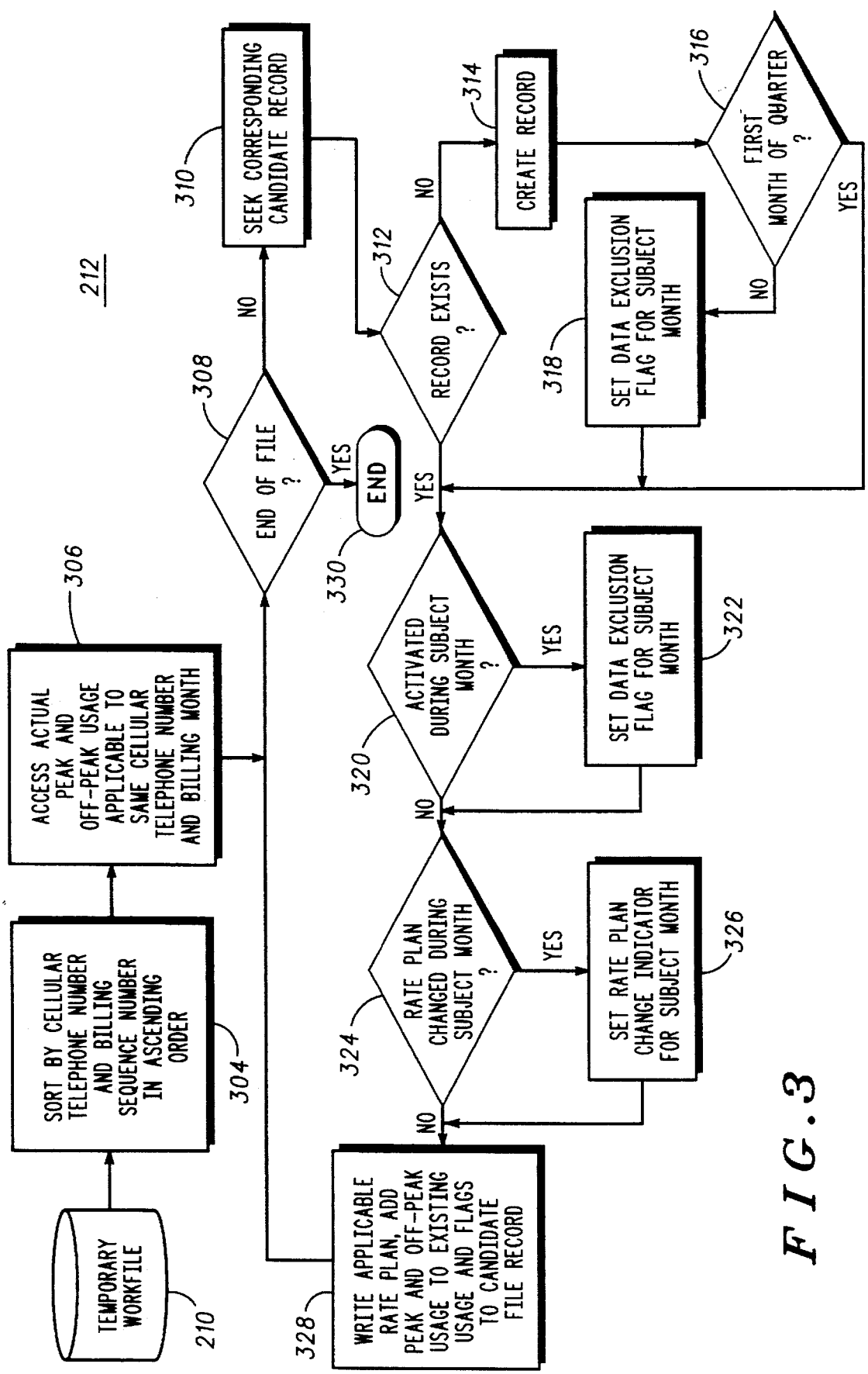
FIG. 3 is a flow diagram for determining records which are no longer relevant according to step 212 of FIG. 2.

Next, at a step 208, the file maintenance utility is used to sort customer detail summary records file 206 according to ascending order of its cellular telephone numbers and descending order of the billing period sequence numbers, producing a temporary workfile 210. At a step 212, temporary workfile 210 is stripped of those records which are no longer relevant for rate plan analysis, producing the quarterly active customer summary record file 214. The more detailed flow chart of FIG. 3 shows the process for which records should be reviewed to determine whether they are appropriate for rate plan analysis. At a step 216, the optimal rate plan is determined and provided in a report at a step 218. The method for determining the optimal rate plan will be shown in greater detail in FIG. 4, and the preferred output fields of a report will be described in FIG. 5.

Turning first to FIG. 3, a flow diagram illustrates step 212 in FIG. 2, wherein the temporary workfile is stripped of records for cellular telephones which are no longer relevant for rate plan analysis. Temporary file 210 is sorted at a step 304 according to ascending cellular telephone number and billing period sequence number order by the mainframe file utility for all users having non-zero usage information. Actual peak and off-peak usage information associated with each cellular telephone is accessed from information in the candidate file 136 at a step 306. At a step 308, it is determined whether the end of the file has been reached. If the end of the file has not been reached, the corresponding candidate record is sought at a step 310. The temporary workfile is then stripped of records for mobiles which are no longer relevant. If the search for a corresponding record is negative, then a record is created at a step 314. A test at a step 316 causes a data exclusion flag to be set at a step 318 in all cases except records for the first month in the quarter. A test at a step 320 causes a data exclusion flag to be set at a step 322 for records in which the cellular telephone number was activated during the month, and a test at a step 324 causes a rate plan change flag to be set at a step 326 when a rate plan change occurred during the month. The peak and off-peak usage accessed at step 306 and the flags are then written at a step 328 to the record, and the processing continues until an end of file is encountered at step 308. Accordingly, only appropriate records are subjected to rate plan analysis.

Figure 4:
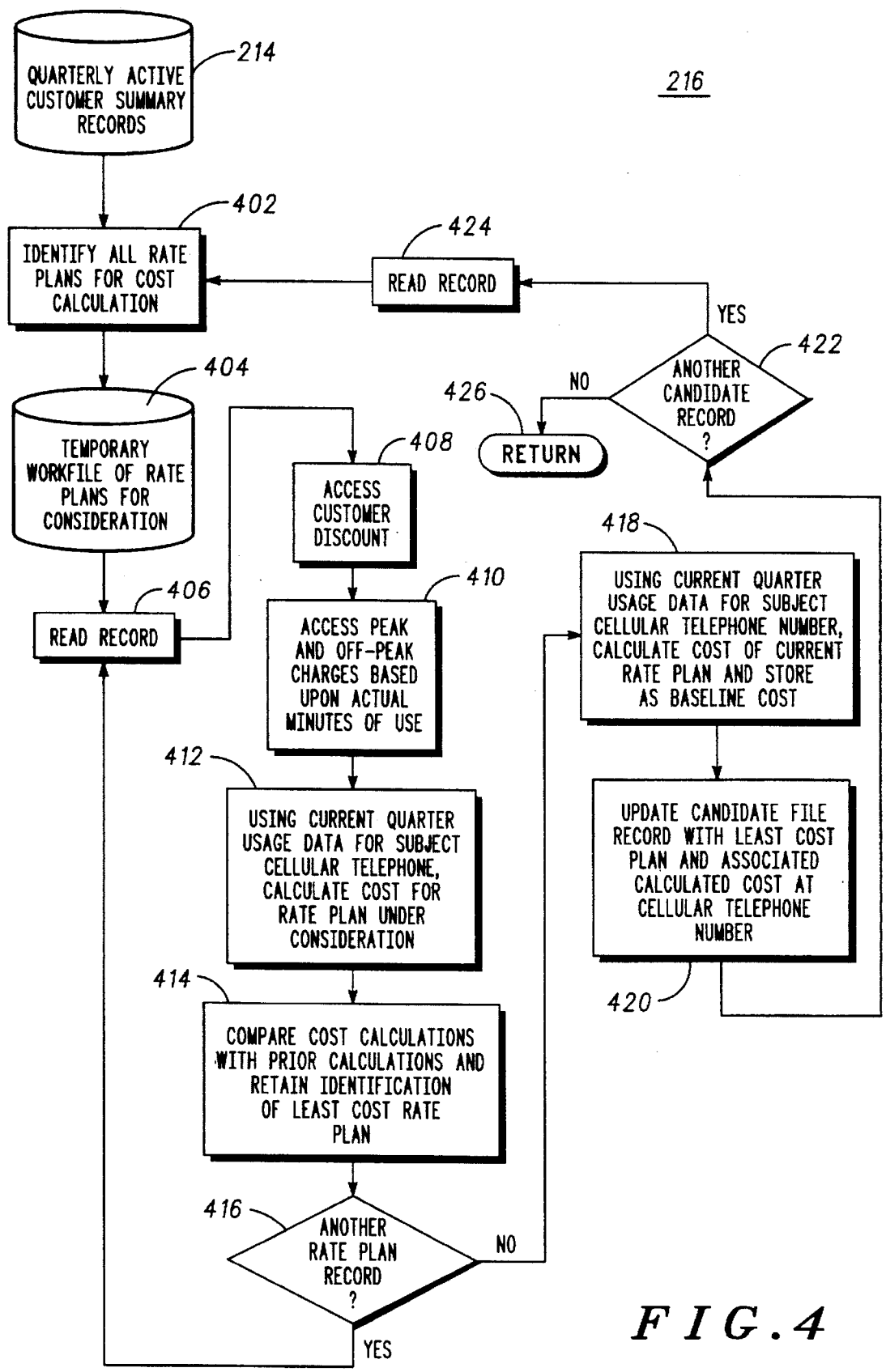
FIG. 4 is a flow diagram for determining an optimal rate plan according to step 216 of FIG. 2.

Referring now to FIG. 4, a flow chart shows preferred steps for determining an optional rate plan according to the present invention. While these steps are preferably performed in the mainframe, a commercially available file transfer program (such as the program "SIM/XFER" available from SIMWARE Inc.) could be used to transfer quarterly active customer summary record files 214 to a personal computer (such as an Intel 80X86 microprocessor based personal computer using MS-DOS or PC-DOS operating system). In either case, a record of the quarterly active customer summary records is read. At step 402, the tariff tables are searched for all rate plans which may be considered as alternatives to the current rate plan. The determination of which plans are to be considered is a function of the rate plan rules, and may take into account one or more of such factors as the total number of minutes usage by the cellular telephone number, peak and off-peak usage and/or the aggregate average usage. The rate plan codes for the eligible plans are written to a temporary workfile 404.

At a step 408, the customer discount is accessed. The customer discount is preferably located in the customer detail file for the particular user telephone number. At a step 410, the peak and off-peak charges are calculated based upon the actual minutes for peak and off-peak usage for the particular user telephone number based upon the current rate plan. At a step 412, the cost for a new rate plan under consideration is calculated using the same peak and off-peak usage data for the current quarter for the particular user telephone number. At a step 414, the cost calculations for the new rate plan under consideration are compared with the prior calculations. The costs are calculated by multiplying the peak and off-peak usage minutes by the peak and off-peak rates, respectively, for each rate plan. Any additional charges, such as an access charge or taxes are added, while deductions such as customer discounts are deducted. It is then determined at a step 416 if another rate plan record is available. If another rate plan record is available, the record is read at a step 406. However, if no additional rate plan record is available, the cost of the current rate plan is stored as a base line cost using the current quarter usage data for the particular cellular telephone at a step 418. The candidate file record is then updated at a step 420 with the least cost plan and the associated calculated cost for the particular cellular telephone. At a step 422, it is determined whether another candidate record exists. If an additional record exists, the record is read at step 422. However, if no additional candidate record is available, the processing is ended at a step 426.

Figure 5:
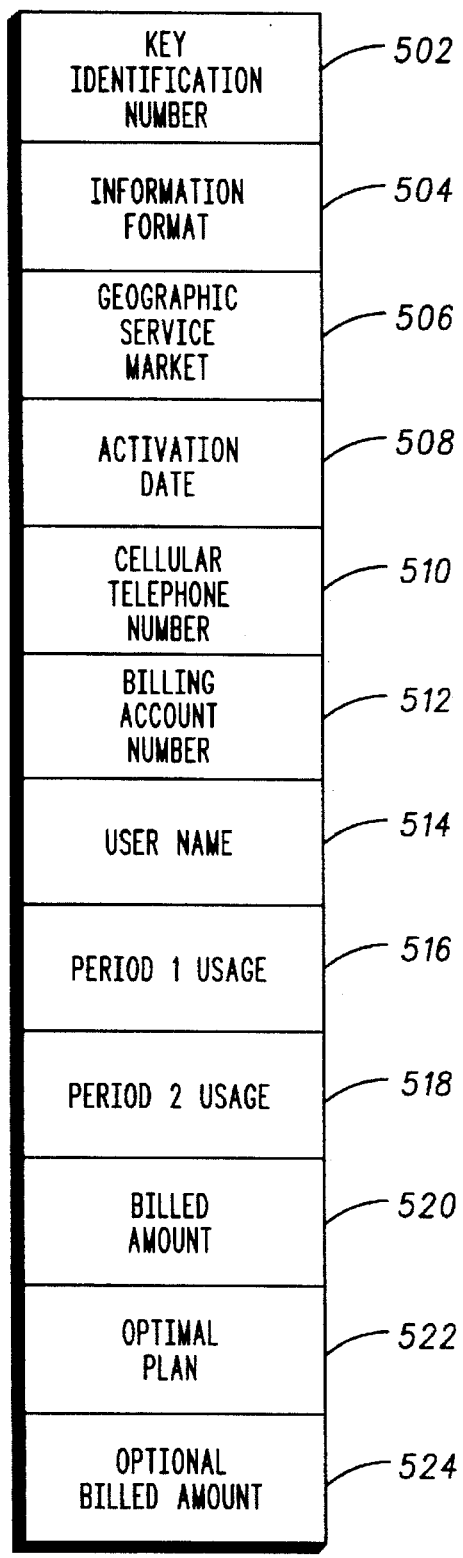
FIG. 5 is a chart showing preferred reports generated at step 218 of FIG. 2.

Turning now to FIG. 5, the preferred fields for an output report are shown. In particular, the report preferably includes a key identification number 502, information format 504, geographic service market 506, activation date 508, cellular telephone number 510, billing account number 512, user name 514, period one usage 516 (for peak usage), period two usage 518 (for off-peak usage), billed amount 520, optimal plan 522, and optimal build amount 524. However, other relevant fields could be incorporated within the scope of the present invention.

In summary, a unique billing system has been described for billing customers for cellular telephone services and providing accurate costs for other eligible service plans, wherein actual peak and off-peak usage information, as well as other billing information such as customer discounts are used to provide rate plan analysis for alternative rate structures. As a result, a customer may obtain consolidated billing and usage information and actual costs for other eligible service plans for all of its cellular telephones as well as individual bills for each of its users. Although the invention has been described and illustrated in the above description and drawings, it is understood that this description is by way of example only and that numerous changes and modifications can be made by those skilled in the art without departing from the true spirit and scope of the invention. Applicant's invention should be limited only by the following claims:

I claim:

1. A method of selecting one of a plurality of rate plans for cellular radiotelephone users each having corresponding user records from one or more cellular systems gathered in a billing pool, said billing pool including user records for at least a current billing period and a previous billing period, each user record including a current rate plan and usage information for the current and previous billing periods, said method comprising the steps of:
   a) selecting all user records from the billing pool for each cellular radiotelephone user which has non-zero usage information;
   b) creating an active customer summary record for each cellular radiotelephone user by accumulating the usage information in all corresponding user records;
   c) accessing peak and off-peak usage minutes in the accumulated usage information of all corresponding user records;
   d) calculating costs for each cellular radiotelephone user based upon the usage minutes in the corresponding active customer summary record and at least two of the rate plans; and
   e) selecting for each cellular radiotelephone user a rate plan which has the lowest calculated cost.

2. The method according to claim 1 wherein said step a) further comprises the step of excluding all user records for each cellular radiotelephone user which has changed current rate plans during the current or previous billing periods.

3. The method according to claim 1 wherein said step a) further comprises the step of excluding all user records for each cellular radiotelephone user which has been activated during the current billing period.

4. The method according to claim 1 wherein said step c) further comprises the step of accessing customer discount information.

5. The method according to claim 4 wherein said step d) further comprises the step of multiplying the peak and off-peak usage minutes by peak and off-peak rates, respectively, for each rate plan and subtracting customer discount information.

6. The method according to claim 1 further comprising the step f) of outputting, for each cellular radiotelephone user, the corresponding selected rate plan, current rate plan, and accumulated usage information.

7. A method of selecting one of a plurality of rate plans for cellular radiotelephone users each having corresponding user records from one or more cellular systems gathered in a billing pool, said billing pool including user records for at least a current billing period and a previous billing period, each user record including a current rate plan and usage information for the current and previous billing periods, said method comprising the steps of:
   a) selecting all user records from the billing pool for each cellular radiotelephone user which has non-zero usage information;
   b) creating an active customer summary record for each cellular radiotelephone user by accumulating the usage information in all corresponding user records;
   c) accessing peak and off-peak usage minutes in the accumulated usage information and customer discount information of all corresponding user records;
   d) calculating costs for each cellular radiotelephone user based upon the usage minutes in the corresponding active customer summary record and at least two of the rate plans by multiplying the peak and off-peak usage minutes by peak and off-peak rates, respectively, for each rate plan and subtracting customer discount information; and
   e) selecting for each cellular radiotelephone user a rate plan which has the lowest calculated cost.

8. The method according to claim 7 wherein said step a) further comprises the step of excluding all user records for each cellular radiotelephone user which has changed current rate plans during the current or previous billing periods and all user records for each cellular radiotelephone user which has been activated during the current billing period.

9. The method according to claim 7 further comprising the step f) of outputting, for each cellular radiotelephone user, the corresponding selected rate plan, current rate plan, and accumulated usage information.

10. A method of selecting one of a plurality of rate plans for cellular radiotelephone users each having corresponding user records from one or more cellular systems gathered in a billing pool, said billing pool including user records for at least a current billing period and a previous billing period, each user record including a current rate plan and usage information for the current and previous billing periods, said method comprising the steps of:
   a) selecting all user records from the billing pool for each cellular radiotelephone user which has non-zero usage information;
   b) excluding all user records for each cellular radiotelephone user which has changed current rate plans during the current or previous billing periods and excluding all user records for each cellular radiotelephone user which has been activated during the current billing period c) creating a quarterly active customer summary record for each cellular radiotelephone user by accumulating the usage information in all corresponding user records;

d) accessing peak and off-peak usage minutes in the accumulated usage information and customer discount information of all corresponding user records;

d) calculating costs for each cellular radiotelephone user based upon the usage minutes in the corresponding quarterly active customer summary record and at least two of the rate plans by multiplying the peak and off-peak usage minutes by peak and off-peak rates, respectively, for each rate plan and subtracting customer discount information;

e) selecting for each cellular radiotelephone user a rate plan which has the lowest calculated cost; and f) outputting, for each cellular radiotelephone user, the corresponding selected rate plan, current rate plan, and accumulated usage information.

* * * * *